United States Patent [19]

Tuel et al.

[11] Patent Number: 5,656,252
[45] Date of Patent: Aug. 12, 1997

[54] PROCESS FOR OBTAINING ZEOLITES CONTAINING TITANIUM

[75] Inventors: Alain Tuel, Villeurbanne; Rémy Teissier, Francheville, both of France

[73] Assignee: Elf Aquitaine Production, Courbevoie, France

[21] Appl. No.: 380,724

[22] Filed: Jan. 30, 1995

[30] Foreign Application Priority Data

Jan. 28, 1994 [FR] France ..................... 94 00978

[51] Int. Cl.$^6$ .................... C01B 39/08; C01B 39/36; C01B 39/40
[52] U.S. Cl. .................. 423/705; 423/707; 423/DIG. 22; 423/DIG. 29
[58] Field of Search ..................... 423/701, 702, 423/704, 705, 707, 713, DIG. 22, DIG. 29; 502/77

[56] References Cited

U.S. PATENT DOCUMENTS

| | | | |
|---|---|---|---|
| 4,410,501 | 10/1983 | Taramasso et al. | 502/242 |
| 4,831,202 | 5/1989 | Giusti et al. | 423/713 |
| 5,082,641 | 1/1992 | Popa et al. | 423/326 |
| 5,254,746 | 10/1993 | Costantini et al. | 423/326 |
| 5,412,122 | 5/1995 | Saxton et al. | 549/531 |

FOREIGN PATENT DOCUMENTS 1185224  4/1985  Canada.

OTHER PUBLICATIONS

Lok et al "The Role of Organic Molecules in Molecular Sieve Synthesis" *Zeolites* vol. 3 Oct. 1983.

*Primary Examiner*—Mark L. Bell
*Assistant Examiner*—David Sample
*Attorney, Agent, or Firm*—Burgess, Ryan & Wayne

[57] ABSTRACT

The subject of the present invention is a process for the preparation of zeolites in which some of the silicon atoms are replaced by titanium atoms, by hydrothermal reaction of a silicon source with titanium tetrafluoride in the presence of a structuring agent.

13 Claims, No Drawings

PROCESS FOR OBTAINING ZEOLITES CONTAINING TITANIUM

BACKGROUND OF THE INVENTION

1) Field of the Invention

The present invention relates to a process for the preparation of zeolites in which some of the silicon is substituted with titanium.

2) Background Art

The zeolites of type MFI in which some of the silicon atoms are substituted with titanium atoms are known products which are described, in particular, in the U.S. Pat. No. 4,410,501; these zeolites are designated TS-1. In accordance with the abovementioned U.S. Patent the zeolites TS-1 are prepared by reaction in the aqueous phase at between 130° and 200° C. and under autogenous pressure of a silicon source (for example alkyl orthosilicates, colloidal silica, alkali metal silicates) with a titanium oxide source consisting of a hydrolyzable derivative of titanium ($TiCl_2$, $TiOCl_2$, alkyl titanates) in the presence of a nitrogenous base such as a quaternary ammonium hydroxide, in the absence of alkali metal ions. In this process, the preferred sources of silicon and of titanium which have been recommended are tetraethyl silicate and tetraethyl titanate; tetrapropylammonium hydroxide (TPAOH) represents the base which is most suitable for the implementation of the process. The zeolites TS-1 obtained by this process conform to the general formula:

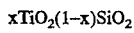

$$xTiO_2(1-x)SiO_2$$

in which x is an integral or fractional number which is greater than 0 and less than or equal to 0.025.

Zeolites of type MEL in which some of the silicon is replaced by titanium (zeolites TS-2) have been prepared by an analogous process, using tetrabutylammonium hydroxide as structuring agent (cf. J. S. Reddy et al., Appl. Catal. 58, page 1 (1990)).

These titanosilicalites of type MFI or MEL have rapidly shown themselves to be excellent catalysts in a large number of reactions in organic chemistry, and in particular for the oxidation of organic compounds using hydrogen peroxide. However, it has been found that the catalytic activity of the zeolites TS-1 is affected by the presence of extrareticular titanium (cf. U. Romano et al., Chim. Ind. (Milan) 72, p.610 (1990); T. Tatsumi et al., J. Chem. Soc. Chem. Commun., p.476 (1990)). This presence results from the precipitation of $TiO_2$ by premature hydrolysis of the titanium source under the reaction conditions, especially when use is made of tetraethyl orthotitanate, which very readily undergoes hydrolysis at room temperature. In order to avoid this precipitation and to increase the content of intrareticular titanium in the titanosilicalites, A. Thangaraj et al., J.Catal. (1991) vol.130 p.1–8; ZEOLITHES vol.12 p.943 (1992) have proposed the replacement of tetraethyl orthotitanate by a less hydrolytable compound; to this effect they have recommended the use of tetrabutyl titanate in solution in anhydrous isopropyl alcohol and of specific procedures for employing the reactants. According to these authors the molar Si/Ti ratio of the titanosilicalites thus obtained would have been lowered to a value in the region of 10, a result which is, moreover, contested by some authors (cf. R. Millini et al., J.Catalysis 137, p.497 (1992)).

A further disadvantage of the abovementioned processes lies in the need to use structuring agents which are free of alkali metal or alkaline earth metal ions, in order to avoid the formation of alkali metal titanates or alkaline earth metal titanates, which are inactive in the reaction of formation of the zeolite. This involves treatment of the commercial aqueous solutions of quaternary ammonium hydroxides prior to their use, for example by electrodialysis.

To sum up, the processes which have been used to date possess disadvantages, which complicate their industrial implementation, and there exists a need to provide industry with a process which is not subject to the constraints of using an anhydrous carrier for the titanium source and of removing the alkali metal ions from the structuring agent.

The present invention proposes to provide industry with a process for the manufacture of zeolites containing titanium, which does not have the drawbacks of the prior processes.

To this end a first objective of the present invention is to do away with the need to use an anhydrous carrier in order to add the titanium source to the reaction medium. A second objective of the present invention is to avoid the rapid hydrolysis of the titanium source when it is placed in contact with the structuring agent. A third objective is to develop a process which does not require the use of a quaternary ammonium hydroxide which is free of alkali metal ions.

SUMMARY OF THE INVENTION

The present invention therefore relates to a process for obtaining zeolites in which some of the silicon atoms in the lattice are replaced by titanium atoms, by hydrothermal reaction of a tetravalent silicon source with a tetravalent titanium source, in the presence of an organic structuring agent, characterized in that the titanium source is titanium tetrafluoride.

It has been found that $TiF_4$ has an excellent resistance to hydrolysis in a humid atmosphere under normal conditions and that, consequently, it is not necessary to take special precautions for its use; moreover, when placed in an aqueous alkaline solution at room temperature, $TiF_4$ does not give rise to the precipitation of $TiO_2$. It is therefore no longer necessary to use an anhydrous vehicle for its use, or to take precautions to avoid its hydrolysis while it is being handled. Finally, it does not give rise to the formation of alkali metal titanates when the structuring agent contains alkali metal ions. However, despite this relative stability to hydrolysis, $TiF_4$ makes it possible, under the conventional conditions of hydrothermal reaction, to obtain zeolites whose titanium content can be controlled better.

DESCRIPTION OF THE PREFERRED EMBODIMENTS

Silicon sources which can be used are the silicon derivatives which are conventionally employed, such as: finally divided silicas in the form of hydrogels, aerogels or colloidal suspensions; hydrolysable silicic esters such as the alkyl orthosilicates of formula $Si(OR)_4$ in which R represents an alkyl radical containing from one to four carbon atoms (methyl, ethyl, propyl and butyl radicals). Tetraethyl orthosilicate is preferably used.

The structuring agent employed in the process according to the present invention is chosen from those which have been proposed before now and, in particular, from the tetraalkylammoniumhydroxides in which the alkyl groups contain from 1 to 4 carbon atoms; tetrapropylammonium hydroxides and tetrabutylammonium hydroxides are preferably used. In contrast to the prior processes, it is not necessary to use quaternary ammonium hydroxides in which the alkali metal ions they contain have been removed. It is consequently possible to use commercial aqueous solutions of quaternary ammonium hydroxides. However, it would not be outside the scope of the present invention to use structuring agents which are free of alkali metal ions.

The conditions for the hydrothermal reaction are those which are conventionally employed. The process takes place in two phases. During a first phase, an aqueous reaction mixture is prepared which contains at least one silicon source, the structuring agent and titanium tetrafluoride. This mixture may be maintained at a temperature of between about 15° C. and about 50° C. and for a time which is sufficient for the silicon source to be hydrolyzed the duration of this phase depends on the chosen temperature. A highly suitable duration is generally between about 10 min and 2 hours. The pH of the reaction medium is preferably greater than 10; a pH of from 10 to 12 is highly suitable. The mode of addition of the reactants is not critical; thus the titanium tetrafluoride may be added to the aqueous medium containing the silicon source before or after addition of the structuring agent, and in the latter case before or after having carried out the hydrolysis of the silicon source. The titanium tetrafluoride may be added to the hydrolysis medium either in the form of a powder or in the form of a suspension in a carrier liquid. Owing to its stability to hydrolysis at room temperature, water may be used as carrier liquid.

During the second phase the zeolite is crystallized by heating the reaction medium from the first phase under autogenous pressure at a temperature ranging from 120° to 200° C. and preferably from 160° to 190° C. The duration of the crystallization phase depends on the reaction conditions; in general, this duration is between 1 and 7 days. When an alkyl silicate is used as silicon source, the alcohol formed during the hydrolysis is removed by distillation at atmospheric pressure or under reduced pressure, before carrying out the crystallization phase.

The quantities of silicon derivatives and of $TiF_4$, expressed in moles, may vary within wide limits, depending on the desired composition of the zeolite, i.e. the required Si/Ti ratio. These quantities may be in the region of the stoichiometry of the reaction for the desired composition, or may deviate substantially from it. In general, the quantity of $TiF_4$, expressed in moles per mole of silicon derivatives, and in particular per mole of alkyl orthosilicate, may lie within a range from approximately 0.005 to approximately 0.2 and preferably from approximately 0.05 to approximately 0.15.

The quantity of structuring agent which is used in the present process, expressed in moles per mole of silicon derivative and, in particular, of alkyl orthosilicate may lie within a range from approximately 0.1 to approximately 2 and preferably from approximately 0.2 to approximately 0.6.

The quantity of water which is present in the reaction medium is not critical and may vary within wide limits. In general, a suitable quantity of water lies within a range from approximately 5 to approximately 100 moles and, preferably, from approximately 20 to approximately 50 moles, per mole of silicon derivative.

The solid obtained at the end of the reaction is separated from the reaction medium by filtration, washed with water, and dried at a temperature which is greater than or equal to 100° C., then calcined at a temperature which is greater than or equal to 500° C. in order to remove the structuring agent. When the structuring agent used contains alkali metal ions, it is preferable to subject the zeolite obtained to an acid treatment in order to remove the alkali metal ions which it contains. For this purpose, simply washing it with an aqueous solution is sufficient; in this case an aqueous solution of a strong mineral acid can be used, for example a solution of hydrochloric acid.

The process according to the invention makes it possible to obtain zeolites of type MFI (zeolites TS-1) or of type MEL (zeolites TS-2) depending on the nature of the structuring agent employed.

The product thus obtained has the spectral characteristics of zeolites TS-1 or TS-2. Thus the X-ray diffraction diagram, the infrared spectrum and the silicon-29 NMR spectrum obtained by rotation at the magic angle show the bands which are characteristic of the presence of a heteroatom in the crystalline lattice displayed by the zeolites of type MFI or MEL. The unit cell of the zeolites conforms to the formula:

$$Si_{(96-x)}Ti_x O_{192}$$

in which x, which represents the number of titanium atoms present in the unit cell, may adopt any value in the range from 0.0001 to 2 and preferably from 0.001 to 2.

The zeolites which are obtained by the process of the invention are known catalysts which are used in organic synthesis. Thus they are very particularly suitable as catalysts in oxidation reactions which employ hydrogen peroxide, among which there may be mentioned without implying limitation the hydroxylation of aromatic compounds such as phenols and phenol ethers, and the ammoxidation of ketones (for example cyclohexanone).

The following non-limiting examples illustrate the invention and show how it may be implemented.

EXAMPLE 1

25 ml of ethyl silicate and 40 ml of a one molar aqueous solution of tetrapropylammonium hydroxide free of alkali metal ions are placed in a 250 ml round-bottomed flask equipped with a heating device and a stirrer system. Stirring is commenced and the contents of the flask are maintained at room temperature for 30 min; 40 ml of distilled water are added thereto and then the temperature of the mixture is raised to 80° C. and maintained at this temperature for 2 h with stirring in order to drive out the ethanol which is formed. The heating is then discontinued and the contents of the flask are cooled to 35° C. before adding 0.45 g of $TiF_4$ to the silica gel thus obtained; the gel takes on a milky colouration. Stirring is continued for 5 min and then the contents of the flask are transferred to a 250 ml pressure-resistant vessel provided with an interior coating of TEFLON and equipped with a heating device and a stirrer system. The contents of the reactor are brought to 170° C. over 1 h with stirring (300 rotations per min) and then maintained under these conditions for 2 days. The white solid which is precipitated during the reaction is filtered and then washed 5 times with 250 ml of distilled water each time, then subjected to suction and dried by heating at 120° C. for 12 h. It is subsequently calcined at 500° C. for 10 h in order to remove tetrapropylammonium hydroxide.

5.43 g of a white product have thus been obtained whose content by weight of titanium is 1.45% and whose fluorine content is 0.093%. This product (designated TS-1(F) below) has the X-ray diffraction diagram which is characteristic of a crystalline product and of a silicalite of type MFI. Its infrared spectrum contains a band at 960 cm⁻ which is characteristic of titanosilicalites. Its UV spectrum does not contain any bands characteristic of the presence of extr-areticular $TiO_2$. The Si/Ti molar ratio of TS-1(F) is 54.

COMPARATIVE TEST

By way of a comparative test, a titanosilicalite was prepared by following the process described in U.S. Pat. No.

4,410,501: 25 ml of ethyl orthosilicate and 0.45 ml of tetraethyl titanate are placed in a 100 ml round-bottomed flask equipped with a stirrer system, a heating device and a dropping funnel. The contents of the flask are stirred at room temperature for 10 min and then 40 ml of a one molar solution of tetrapropylammonium hydroxide free of alkali metal ions is added to them over 10 min with vigorous stirring. The reaction mixture is maintained at room temperature with stirring for 30 min and then 40 ml of distilled water are added to it and the mixture is brought to 80° C. for 3 h. The colourless liquid thereby obtained is transferred to an autoclave containing an interior coating of TEFLON, in which the mixture is maintained at 170° C. with stirring and under autogenous pressure for 3 days.

After cooling of the reaction mass, the latter is filtered and the solid product recovered is washed 5 times with 250 ml of distilled water each time and then dried at 110° C. for 12 h; the dry product is subsequently calcined in air by heating at 550° C. for 10 h in order to remove the tetrapropylammonium hydroxide.

The solid product obtained in this way is subjected to the same analyses as the product obtained in Example 1. It has the same spectral characteristics; its content by weight of titanium is 1.33%, which represents an Si/Ti molar ratio of 59.

EXAMPLE 2

The procedure of Example 1 was followed, but with replacement of the quaternary ammonium hydroxide free of alkali metal ions by a commercial solution of tetrapropylammonium hydroxide containing 0.1% by weight of Na ions and 0.32% by weight of K ions. The calcined product is washed once with 100 ml of a 1 molar solution of hydrochloric acid in order to remove the alkali metal ions. Under these conditions 5.22 g of a product are obtained whose Ti content is 1.39% by weight and whose fluorine content is 0.083% by weight and which has the same spectral characteristics as the product of Example 1. The Si/Ti molar ratio of the product obtained is 56.

The catalytic activity of the zeolite TS-1(F) obtained as described above was tested for the hydroxylation of phenol to hydroquinone and pyrocatechol. For this purpose a glass reactor equipped with a stirrer system and with a device for heating by circulation of thermostated water was charged with:

10 g of phenol (equal to 106 millimoles) in solution in 15 ml of methanol;

0.5 g of TS-1(F) obtained according to the process described above; the contents of the reactor were then brought to 70° C. with stirring and 2.4 ml of 30% by weight hydrogen peroxide (21.2 millimoles) were added. These conditions were subsequently maintained for 2 h. The reaction mass is then cooled to 20° C. and the unreacted hydrogen peroxide is then assayed using potassium iodide in acidic medium, and the diphenols formed by gas chromatography. It was found that the reaction had led to the formation of hydroquinone (HQ) and pyrocatechol (PC) but not to that of resorcinol. The results obtained were as follows:

degree of conversion of $H_2O_2$: 70% yield of diphenols relative to the hydrogen peroxide converted: 92% ration of HQ/HQ+PC: 0.67.

EXAMPLES 3 AND 4

The procedure of Example 1 was followed, but varying the quantity of $TiF_4$ so as to obtain silicalites with a varying titanium content. The results obtained are shown in the table below:

| | | | PRODUCT OBTAINED | | | |
|---|---|---|---|---|---|---|
| EX. | $TiF_4$ g | Molar charge of Si/Ti | quantity in g | Ti content % by weight | fluorine content % by weight | Si/Ti in moles |
| 3 | 0.43 | 31 | 4.97 | 1.65 | 0.037 | 47 |
| 4 | 0.76 | 19 | 5.17 | 1.7 | 0.125 | 45 |

The products thus obtained have an X-ray diffraction diagram which includes the bands which are characteristic for the MFI structure and for a crystalline solid. The IR spectrum shows the band at 960 cm$^{-1}$ which is characteristic for titanosilicalites. Its UV spectrum does not have the bands which are characteristic for the presence of extrareticular $TiO_2$.

We claim:

1. A process for obtaining zeolites of type MFI or MEL in which some of the silicone atoms in the lattice are replaced by titanium atoms, which comprises hydrothermally reacting a tetravalent silicon source with a tetravalent titanium source in the presence of a tetraalkylammonium hydroxide structuring agent wherein the titanium source is titanium tetrafluoride.

2. The process for obtaining zeolites in which some of the silicon atoms in the lattice are replaced by titanium atoms according to claim 1, wherein the silicon source is selected from the group consisting of finely divided silica in the form of a hydrogel, aerogel or colloidal suspension and the alkyl orthosilicates of general formula:

$Si(OR)_4$ in which R represents an alkyl radical having from 1 to 4 carbon atoms.

3. The process for obtaining zeolites in which some of the silicon atoms in the lattice are replaced by titanium atoms according to claim 2, wherein the silicon source is tetraethyl orthosilicate.

4. The process for obtaining zeolites in which some of the silicon atoms in the lattice are replaced by titanium atoms according to claim 3, wherein the structuring agent is a tetraalkylammonium hydroxide in which the alkyl radical contains from 1 to 4 carbon atoms.

5. The process for obtaining zeolites in which some of the silicon atoms in the lattice are replaced by titanium atoms according to claim 4, wherein the structuring agent is tetrapropylammonium hydroxide.

6. The process for obtaining zeolites in which some of the silicon atoms in the lattice are replaced by titanium atoms according to claim 4, wherein the structuring agent is tetrabutylammonium hydroxide.

7. The process for obtaining zeolites in which some of the silicon atoms in the lattice are replaced by titanium atoms according to claim 6, wherein the quantity of structuring agent, expressed in moles per mole of silicon, is within a range from 0.1 to 2 moles.

8. The process for obtaining zeolites in which some of the silicon atoms in the lattice are replaced by titanium atoms according to claim 7, wherein the quantity of $TiF_4$, expressed in moles per mole of silicon, is within a range from 0.005 to 0.2.

9. The process for obtaining zeolites in which some of the silicon atoms in the lattice are replaced by titanium atoms according to claim 8, wherein, in a first step, a reaction mixture is prepared which contains the silicon Source, water, the structuring agent and the titanium tetrafluoride and then, in a second step, the reaction mixture from the first step is crystallized.

10. The process for obtaining zeolites in which some of the silicon atoms in the lattice are replaced by titanium atoms according to claim 9, wherein the temperature of the first step lies within a range from 15° to 50° C.

11. The process for obtaining zeolites in which some of the silicon atoms in the lattice are replaced by titanium atoms according to claim 9, wherein the temperature of the crystallization phase lies within a range from 120° to 200° C.

12. The process for obtaining zeolites in which some of the silicon atoms in the lattice are replaced by titanium atoms according to claim 11, wherein the quantity of water present in the reaction medium, expressed in moles per mole of silicon, lies within a range from 20 to 50 moles.

13. A process for obtaining zeolites of type MFI or MEL containing intrareticular titanium which comprises a first step in which a reaction mixture containing a silicon source water, a tetraalkylammonium hydroxide structuring agent and titanium tetrafluoride is heated to a temperature within a range from 15° to 50° C., a second step wherein the reaction mixture is crystallized at a temperature within a range from 120° to 200° C., a further step wherein a solid is separated from the reaction mixture, washed and dried, and calcined at a temperature of at least 500° C.

* * * * *